(12) United States Patent
Murphy et al.

(10) Patent No.: US 7,603,422 B2
(45) Date of Patent: Oct. 13, 2009

(54) SECURE SAFE SENDER LIST

(75) Inventors: Elissa E. S. Murphy, Seattle, WA (US);
Geoffrey J Hulten, Lynwood, WA (US);
Manav Mishra, Kirkland, WA (US);
Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 11/023,049

(22) Filed: Dec. 27, 2004

(65) Prior Publication Data
US 2006/0143271 A1 Jun. 29, 2006

(51) Int. Cl.
*G06F 15/16* (2006.01)
(52) U.S. Cl. .................................................. 709/206
(58) Field of Classification Search ................ 709/204, 709/206; 726/1, 2, 3, 4, 5, 16, 17, 21
See application file for complete search history.

(56) References Cited

U.S. PATENT DOCUMENTS

| 5,999,967 | A | 12/1999 | Sundsted | |
|---|---|---|---|---|
| 6,112,227 | A | 8/2000 | Heiner | |
| 6,199,102 | B1 | 3/2001 | Cobb | |
| 7,089,241 | B1 * | 8/2006 | Alspector et al. | 707/7 |
| 2002/0016824 | A1 | 2/2002 | Leeds | |
| 2002/0169954 | A1 | 11/2002 | Bandini et al. | |
| 2004/0193684 | A1 | 9/2004 | Ben-Yoseph | |
| 2004/0205135 | A1 * | 10/2004 | Hallam-Baker | 709/206 |
| 2007/0143407 | A1 * | 6/2007 | Avritch et al. | 709/206 |

FOREIGN PATENT DOCUMENTS

| WO | WO03054764 | 7/2003 |
|---|---|---|
| WO | WO2004054188 | 6/2004 |

OTHER PUBLICATIONS

Internet Citation: Camram Postage Stamp Basics, Jun. 9, 2002, *the whole document*.
Microsoft: The coordinated Spam Reduction Initiative. (online), Feb. 13, 2004, p. 1.
"Pricing via Processing or Combatting Junk Mail", Dwork et al., IBM Research Division, 12 pages.
"Sender ID", IC Group, website: http://spf.pobox.com/senderid.html, printed Dec. 17, 2004, 2 pages.
"Sender ID Framework Overview", Microsoft Corporation, web site: http://www.microsoft.com/mscorp/twc/privacy/spam/senderid/overview.mspx, Sep. 30, 2004, 2 pages.
"SPF:Sender Policy Framework", IC Group Inc., web site http://spf.pobox.com, printed Dec. 17, 2004, 1 page.

* cited by examiner

*Primary Examiner*—William C Vaughn, Jr.
*Assistant Examiner*—Scott Christensen
(74) *Attorney, Agent, or Firm*—Lee & Hayes, PLLC

(57) ABSTRACT

Secure safe sender lists are described. In an implementation, a method includes determining which of a plurality of hierarchical levels corresponds to a message received via a network. Each of the hierarchical level is defined by mechanisms for identifying a sender of the message. The message is routed according to the corresponding one of the hierarchical levels.

15 Claims, 5 Drawing Sheets

SECURE SAFE SENDER LIST

TECHNICAL FIELD

The present invention generally relates to the field of message communication and more particularly relates to message communication which may employ a secure safe sender list.

BACKGROUND

Communication utilizing messages has provided a wide range of increased functionality to users of computing devices, such as desktop computers, wireless phones, and so on. For example, users may communicate, one to another, through the use of email (i.e., electronic mail). Email employs standards and conventions for addressing and routing such that the email may be delivered across a network, such as the Internet, utilizing a plurality of devices. In this way, emails may be transferred within a company over an intranet, across the world using the Internet, and so on.

The use of email has provided a number of advantages to the user. For example, even though email may be communicated almost instantaneously, email can be dealt with according to the recipient's own schedule, such as when the email is received to provide an immediate response, at a later time when the user has sufficient resources to answer the message, and so on. Additionally, email may allow the user to prioritize messages, such as when to respond to one or more particular emails that were received by the user. Because of these and other advantages, the prevalence of email has continued to expand such that email is now considered an indispensable part of everyday life, both at home and during a typical business day.

In another example, users may communicate, one to another, through the use of instant messaging. For instance, when two users are online at the same time, instant messages may be exchanged in real time between the two users. In this way, the instant messages may be utilized to support a text conversation between the two users in a manner that mimics how the two users would participate in a typical spoken conversation.

Unfortunately, as the prevalence of these techniques for sending messaging has continued to expand, the amount of "spam" encountered by the user has also continued to increase. Spam is typically thought of as an email that is sent to a large number of recipients, such as to promote a product or service. Because sending an email generally costs the sender little or nothing to send, "spammers" have developed which send the equivalent of junk mail to as many users as can be located. Even though a minute fraction of the recipients may actually desire the described product or service, this minute fraction may be enough to offset the minimal costs in sending the spam. Consequently, a vast number of spammers are responsible for communicating a vast number of unwanted and irrelevant emails. Thus, a typical user may receive a large number of these irrelevant emails, thereby hindering the user's interaction with relevant emails. In some instances, for example, the user may be required to spend a significant amount of time interacting with each of the unwanted emails in order to determine which, if any, of the emails received by the user might actually be of interest.

Therefore, there is a continuing need for techniques that may be employed to limit unwanted messages which are communicated over a network.

SUMMARY

A secure safe sender list is described which may be utilized to limit unwanted messages. In an email implementation, for example, the secure safe senders list may reference a plurality of identifying mechanisms that may be utilized to determine whether the email is "genuine" (i.e., is from the indicated sender), such as an email address, third-party certificates, self-signed certificates, monetary attachment (e.g., an "e-stamp"), and so on. Therefore, in this implementation, the secure safe sender list may be utilized to determine whether the email is from a trusted source and therefore may be routed for viewing by the user, and prevent emails that are not from trusted sources from interfering with the user's interaction with relevant emails.

The secure safe sender list may also provide a scalable treatment of messages depending on a level of security associated with the message. For example, the identifying techniques (whether alone or in differing combinations) may provide several different levels (i.e., hierarchies) of security. Messages may be routed based on which of the different levels of security are satisfied by the message. For example, if an email from a particular email address complies with a "high-level" security requirement (e.g., includes a third-party certificate) as designated by the secure safe sender list, then the email may be routed to the user's inbox. However, if the email only meets "lower-level" security requirements, the email may be routed for further processing (such as by a "spam" filter), routed to a dedicated "spam" folder, and so on.

Further, the secure safe sender list may be dynamically configured through use of a user interface. For example, an email may be examined to determine which identifying mechanisms, if any, may be employed to verify the identity of the sender. If the email includes an identifying mechanism that indicates a likelihood that the email was sent from a trusted source, the user may be prompted to add the sender's email address to the secure safe sender list for future routing of emails from that user. In addition, the secure safe sender list may also reference one or more identifying mechanisms (e.g., the third party certificate) that are to be employed for routing future emails from the sender for viewing by the user.

BRIEF DESCRIPTION OF THE DRAWINGS

The same reference numbers are utilized in instances in the discussion to reference like structures and components.

DETAILED DESCRIPTION

Figure 1:
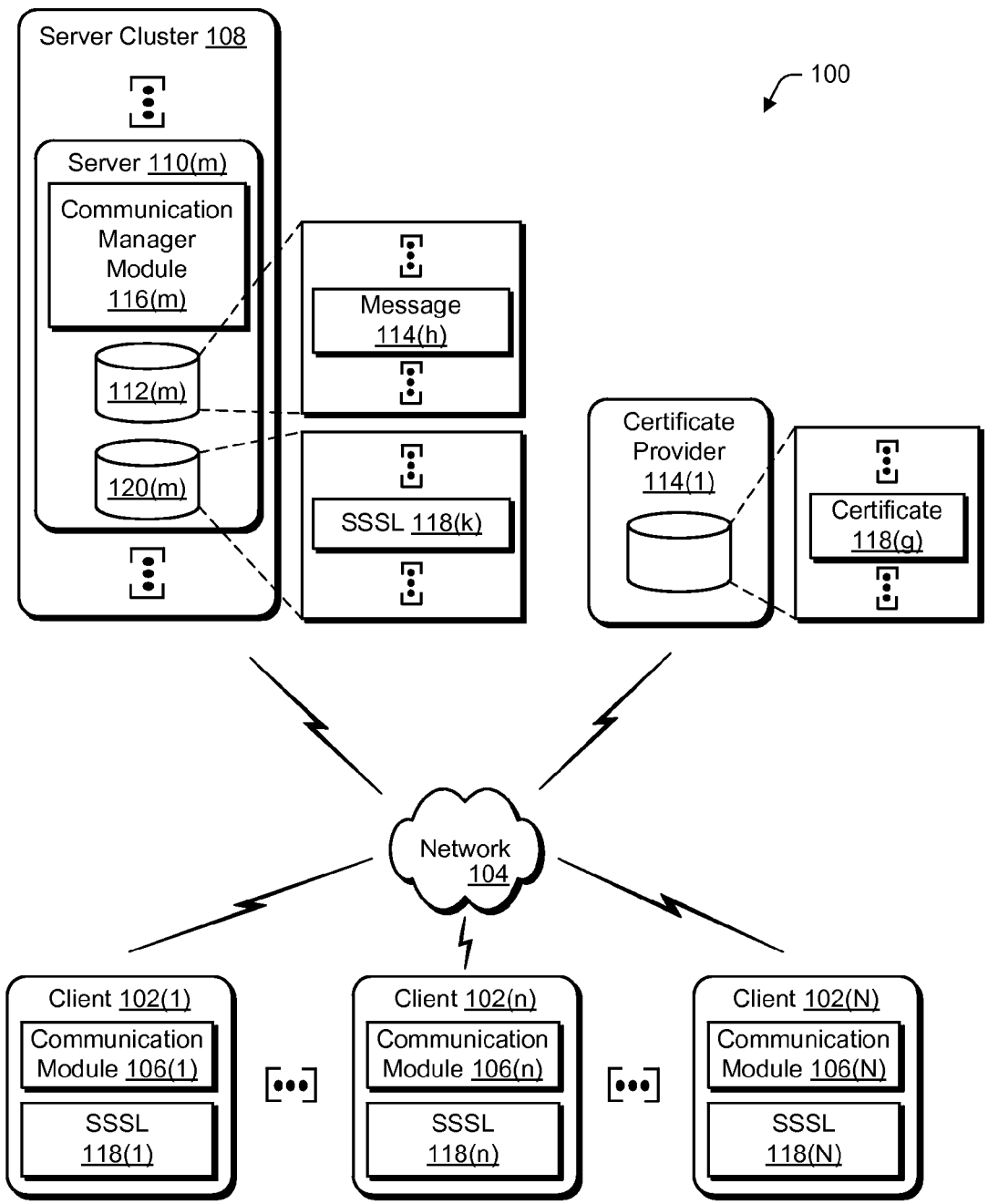
FIG. 1 is an illustration of an environment operable for communication of messages, such as emails, instant messages, and so on, across a network.

FIG. 1 is an illustration of an environment 100 operable for communication of messages across a network. The environment 100 is illustrated as including a plurality of clients 102(1), ..., 102(n), ..., 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(n) may be communicatively coupled via a peer-to-peer network to communicate, one to another. Each of the clients 102(1), 102(n) may also be communicatively coupled to client 102(N) over the Internet. In another instance, the clients 102(1), 102(n) are communicatively coupled via an intranet to communicate, one to another. Each of the clients 102(1), 102(n) in this other instance is also communicatively coupled via a gateway to access to client 102(N) over the Internet.

Each of the plurality of clients 102(1)-102(N) is illustrated as including a respective one of a plurality of communication modules 106(1), ..., 106(n), ..., 106(N). In the illustrated implementation, each of the plurality of communication modules 106(1)-106(N) is executable on a respective one of the plurality of clients 102(1)-102(N) to send and receive messages. For example, one or more of the communication modules 106(1)-106(N) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 106(1)-106(N) may be configured to send and receive instant messages. Instant messaging provides a mechanism such that each of the clients 102(1)-102(N), when participating in an instant messaging session, may send text messages to each other. The instant messages are typically communicated in real time, although delayed delivery may also be utilized, such as by logging the text messages when one of the clients 102(1)-102(N) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In an implementation, the communication modules 106(1)-106(N) communicate with each other through use of a server cluster 108. The communication module 106(n) is executed to verify email using the detected identifying mechanisms and determine an appropriate action from the SSSL 118(n). For example, the communication module 106(n) may query the certificate provider 114(1) of FIG. 1 to determine if the third-party certificate 118(g) is valid. If the verification is successfully performed (e.g., the third-party certificate 118(g) is verified as valid), the communication module 106(n) may then determine which action should be performed on the email from the SSSL 118(n). The server cluster 108 includes a plurality of servers 110(m), where "m" can be any integer from one to "M". The server cluster 108 may be configured to provide a wide variety of functionality, such as load balancing and failover. One or more of the plurality of servers 110(m) in the server cluster 108 may include a respective database 112(m) for storing a plurality of messages 114(h), where "h" can be any integer from one to "H", for communication between the plurality of clients 102(1)-102(N).

Server 110(m), for instance, may include a communication manager module 116(m) (hereinafter "manager module") which is executable thereon to route instant messages between the communication modules 106(1)-106(N). For instance, client 102(1) may cause the communication module 106(1) to form an instant message for communication to client 102(n). The communication module 106(1) is executed to communicate the instant message to the server 110(m), which then executes the manager module 116(m) to route the instant message to the client 102(n) over the network 104. The client 102(n) receives the instant message and executes the respective communication module 106(n) to display the instant message to a respective user. In another instance, when the clients 102(1), 104(n) are communicatively coupled directly, one to another (e.g., via a peer-to-peer network), the instant messages are communicated without utilizing the server cluster 108.

In another example, the server cluster 108 may be configured to store and route email, such as through configuration as an email provider. For instance, like the previous example, client 102(1) may execute the communication module 106(1) to form an email for communication to client 102(n). The communication module 106(1) communicates the email to the server 110(m), which is then stored as one of the plurality of messages 114(h). Client 102(n), to retrieve the email, "logs on" to the server cluster 108 (e.g., by providing a user identification and password) and retrieves emails from a respective user's account. In this way, a user may retrieve corresponding emails from one or more of the plurality of clients 102(1)-102(N) that are communicatively coupled to the server cluster 108 over the network 104. Although messages configured as emails and instant messages have been described, a variety of textual and non-textual messages (e.g., graphical messages, audio messages, and so on) may be communicated via the environment 100 without departing from the sprit and scope thereof. Additionally, SSSL can be utilized for a wide variety of other communication techniques, such as to determine if a user will accept a voice-over-IP (VOIP) call or route the call to voicemail.

As previously described, the efficiently of the environment 100 has also resulted in communication of unwanted messages, commonly referred to as "spam". Spam is typically provided via email that is sent to a large number of recipients, such as to promote a product or service. Thus, spam may be thought of as an electronic form of "junk" mail. Because a vast number of emails may be communicated through the environment 100 for little or no cost to the sender, a vast number of spammers are responsible for communicating a vast number of unwanted and irrelevant messages. Thus, each of the plurality of clients 102(1)-102(N) may receive a large number of these irrelevant messages, thereby hindering the client's interaction with actual emails of interest.

One technique which may be utilized to hinder the communication of unwanted messages is through the use of a "safe sender" list. A safe sender list, for example, may allow email users to specify email addresses (e.g., an address of an entity used to send the email), from which, the user is willing to receive email. For instance, the safe sender list may be utilized to give an email from a specified address "safe passage" through any spam filtering employed by the client for storage in the user's inbox. Unfortunately, some implementations of safe sender lists can be "spoofed". For example, if an attacker discovers an email addresses that is included in the user's safe sender list, the attacker can impersonate the entity represented by one of these addresses, such as by spoofing the "FROM" line in a simple mail transfer protocol (SMTP) communication. Consequently, the attacker's message will be passed directly to the receiver's inbox. Attackers may utilize a wide array of techniques for acquiring the contents of a safe sender list, such as by hacking, guessing, crawling the web for other addresses on the recipient's home page (or on pages that link to or are linked from the recipient's homepage), and so on.

To protect against spoofing and other identity attacks, the environment 100 may incorporate a plurality of secure safe sender lists 118(1), ..., 118(n), ..., 118(N) (hereinafter "SSSL"). The SSSLs 118(1)-118(N) may be configured to combine a variety of identifying mechanisms to verify whether the message was actually communicated from the sender as indicated by the message. For example, SSSL 118(n) may be configured to allow a user to combine information (e.g., an identifying mechanism) that is difficult to spoof along with an email address to form combinations that are more difficult to attack. A SSSL, for instance, may reference a combination that includes an email address "test@test.com" and a third-party certificate. Therefore, a message received by the client 102(n) from test@test.com that is signed with the referenced third-party certificate is passed to the client's inbox. However, another message from test@test.com that does not include the third-party certificate may be treated as if it were not on the SSSL 118(n). Therefore, even if an attacker guesses that "test@test.com" is on a user's safe sender list, the attacker cannot take advantage of that information unless the attacker is also able to sign the email with the corresponding third-party certificate, thereby providing additional protect against spam.

The SSSLs 118(1)-118(N) maybe provided in the environment 100 in a variety of ways. In the illustrated example of FIG. 1, for instance, each of the plurality of clients 102(1)-102(N) includes a respective one of a plurality of SSSLs 118(1)-118(N) which reference particular identifying mechanisms that may be utilized to verify sender's of email. As also illustrated in FIG. 1, a plurality of SSSLs 118(k), where "k" can be any integer from one to "K", may be stored in the server cluster 108. For instance, the server 110(m) may include a database 120(m) which is configured to store a plurality of SSSLs 118(k). The plurality of SSSLs 118(k), for instance, may be copies of the SSSLs 118(1)-118(N) from the plurality of clients 102(1)-102(N). Therefore, the server 110 (m) may utilize the SSSLs 118(1)-118(N) in a manner similar to how the SSSLs 118(1)-118(N) are employed to process messages. However, by performing the processing of the messages at the server cluster 108, the processing functionality may be employed without taxing resources on the plurality of clients 102(1)-102(N), which may be utilized to provide this functionality to "thin" clients as previously described. Additionally, a user may seamlessly gain the advantage of a corresponding single SSSL, even when logging on using different clients. Further discussion of identifying mechanisms that may be referenced and employed by the plurality of SSSLs 118(1)-118(N) may be found in relation to FIG. 2.

In an implementation, one or more of the identifying mechanisms encompassed by the SSSLs 118(1)-118(N) provide for differing levels of security against attack and spoofing. Thus, in this implementation, each of the entries in the SSSLs 118(1)-118(N) may be utilized to provide differing levels of access, such as to a user's inbox. In other words, the SSSL 118(1) may describe a hierarchy of identity verification in which one entry describes one or more identifying mechanisms that are more likely to represent a valid identity than verification performed by another entry that references one or more different identifying mechanisms. For example, a SSSL 118(1) entry that combines an e-mail address with a third-party certificate from a highly-trusted third-party certifier might provide the largest possible boost to a message (e.g. guaranteed delivery to a user's inbox), while an entry that combines an email address with a valid self-signed certificate might provide a strong "hint" as to the identity of the sender, but not guarantee delivery.

The hierarchies may be employed and maintained in a variety of ways. For example, the hierarchies may be built into the SSSLs 118(1)-118(N) (e.g., by hand crafted rules, machine learning, and so on), provided by the user, deployed and updated dynamically from an anti-spam web service, and so on. For example, when SSSLs use secure third-party certificates to guarantee delivery, this can result in closed email system in which users can be confident that each message that is received is valid, e.g., is not "spoofed". Further discussion of use of a SSSL and its referenced identifying mechanisms for processing messages may be found in relation to FIGS. 3 and 4.

Additionally, maintaining the SSSLs 118(1)-118(N) may be performed in a variety of ways. For example, one or more of the communication modules 106(1)-106(N) may be executed to provide a user interface for assisting users in specifying identifying mechanisms and levels of access for entries in the SSSLs 118(1)-118(N). Further discussion of user interfaces may be found in relation to FIG. 5.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the SSL strategies described below are platform-independent, meaning that the strategies may be implemented on a variety of commercial computing platforms having a variety of processors.

Figure 2:
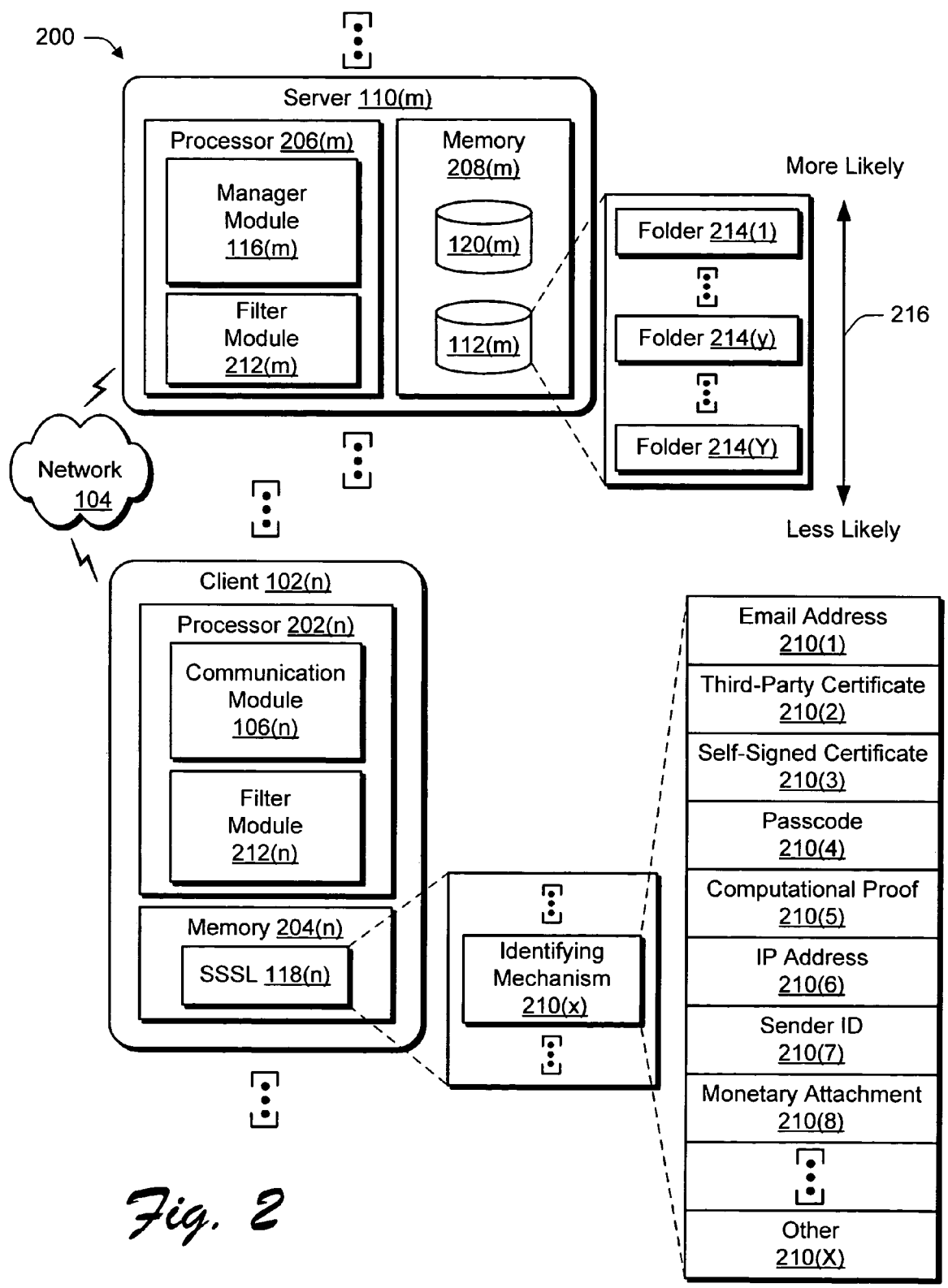
FIG. 2 is an illustration of a system in an exemplary implementation showing the plurality of clients and the plurality of servers of FIG. 1 in greater detail.

FIG. 2 is an illustration of a system 200 in an exemplary implementation showing the plurality of clients 102(n) and the plurality of servers 110(m) of FIG. 1 in greater detail. Each of the plurality of clients 102(n) of FIG. 2 is illustrated as including a respective processor 202(n) and memory 204(n). Likewise, each of the plurality of servers 110(m) is illustrated as include a respective processor 206(m) and memory 208(m) Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204(n) is shown for the respective client 102(n) and a single memory 208(m) is shown for the respective server 10(m), a wide variety of types and combinations of memory may be employed, such as random access memory (RAM), hard disk memory, removable medium memory, and so forth.

The client 102(n) is illustrated as executing a communication module 106(n) on the processor 202(n), which is storable in memory 204(n). The communication module 106(n), when executed, may be utilized to process messages received by the client 102(n) utilizing the respective SSSL 118(n), which is illustrated as stored in the memory 204(n). The SSSL 118(n) references a plurality of identifying mechanisms 210(x), where "x" can be any integer from one to "X", which may be utilized to verify an identity of a sender. In an implementation, the SSSL 118(n) combines one or more identifying mechanisms 210(x) and an action on the SSSL based on which entries (e.g., identifying mechanism, combination of identifying mechanisms, and so on) of the SSSL 118(n), if any, are satisfied by the message. Therefore, when a user receives a message, the communication modules 106(n) and/or manager module 116(m) gather and validate messages utilizing one or more applicable identifying mechanisms 210(x). For example, the identifying mechanisms 210(x) may involve checking that part of a message is signed with a specific private key, that a message was sent from a machine that is approved via a sender's identification for a specified domain, and so on. A variety of identifying mechanisms 210(x) and combinations thereof may be employed in the SSSLs 118(n), examples of which are described as follows.

Email Address 210(1)

The email address 210(1) is a standard form of identity used on safe sender lists, and thus the SSSL 118(n) can support and build upon a legacy safe sender list. The email address 210(1) may be checked by looking at a 'FROM' line in the header of a message. Although the email address 210(1) may be particularly vulnerable to attack as previously described, a combination of the email address 210(1) and another one of the identifying mechanisms 210(x) may result in substantial protection.

Third Party Certificates 210(2)

Third party certificates 210(2) may involve the signing of a portion of a message with a certificate that can be traced to a third-party certifier. This signature can be attached utilizing a variety of techniques, such as through secure/multipurpose Internet mail extension (S/MIME) techniques, e.g., by including a header in the message that contains the signature. In this instance, the SSSL 118(n) entry also contains the identity of the third-party certifier, which may also be validated to further verify the authenticity of a message. The level of security provided by this technique may also be based on the reputation of the third party certifier, a type of certificate (e.g. some certifiers offer several levels of increasingly secure certification), and on the amount of the message signed (signing more of the message is presumably more secure). Thus, an action which is to be performed based on this type of identifying mechanism on the SSSL 210(x) may be chosen based on these pieces of information. For example, an action (e.g., guaranteed delivery) may be performed on messages which are signed by a particular third-party certifier, while messages signed by another third-party certifier may be further processed to determine whether the message is from a trusted source, is spam, and so on.

Self-Signed Certificate 210(3)

A self-signed certificate involves signing a portion of a message with a certificate that the sender created. Like a third-party certificate 210(2), this identifying mechanism may be attached using utilizing a variety of techniques, such as through secure/multipurpose Internet mail extension (S/MIME) techniques, e.g., by including a header in the message that contains the signature. In an implementation, use of a self-signed certificate involves the creation of a public/private key pair by a sender, signing part of the message with the private key, and distributing the public key in the message (or via other standard methods). The level of security provided by this method is based on the amount of the message signed, and thus the action associated with this type of identity on the SSSL can also be chosen based on this information as previously described.

Passcode 210(4)

The passcode 210(4) identifying mechanism involves the use of a passcode in a message, such as by including a public key in a message but not signing any portion of the message with the associated private key. This identity mechanism may be useful for users who have mail transfer agents that modify messages in transfer and destroy the cryptographic properties of signatures, such that the signatures cannot be verified. This identifying mechanism is useful as a lightweight way to establish a form of identity. Although a passcode 210(4) is still potentially spoofable, the passcode 210(4) may be utilized with other identifying mechanisms to provide greater likelihood of verification (i.e., authenticity of the sender's identity). In an implementation, when the passcode 210(4) is utilized alone, an associated action may be configured as a hint to a filter module 212(n).

The filter module 212(n), for instance, may employ a plurality of spam filters which are executable to filter messages for determining whether the message is spam, such as by looking at text and patterns of text in the message. An identifying mechanism 210(x) (e.g., passcode 210(4)) may be utilized to verify the identity of a sender, and if successful, provide a hint to the filter module 212(n) for further processing of the message. Thus, the SSSL 118(n) may be utilized with a variety of new and/or preexisting filters to provide additional spam filtering functionality. Although execution of the spam module 212(n) on the client 102(n) has been described, the server 110(m) may also employ a filter module 212(m) as illustrated which is executable to provide similar functionality.

Computational Proof 210(5)

The computational proof 210(5) identifying mechanism involves attaching a computational proof to a message. For example, a sender may attach a pre-solved computation at some level on the message. The required amount of computation may act as a basis for choosing an action according to this identifying mechanism as previously described.

IP Address 210(6)

The IP address 210(6) identifying mechanism involves validating whether a message was sent from a particular IP address or IP address range (e.g. the IP/24 range 204.200.100.*). In an implementation, this identity method may support a less secure mode in which the IP address/range may appear in any of a message's "received" header lines. As before, the use of a particular IP address, IP address range, and/or where the IP address or range may be located in a message can serve as a basis for choosing which action should be performed on the message.

Valid Sender ID 210(7)

The valid Sender ID 210(7) identifying mechanism involves validating whether a message was sent from a computer that is authorized to send messages for a particular domain via the Sender's ID. For example, an SSSL 118(n) entry for this scenario may contain a reference to a trusted domain. For instance, "test@test.com" is an address and "test.com" is the domain. It should be noted that the domain does not need to match exactly, e.g. the domain could also formatted as foo.test.com. When a message from this address is received, the communication module 106(n) may perform a Sender ID test on the "test.com" domain, and if the message matches the entry, it is valid. This identifying mechanism can also leverage algorithms for detecting IP addresses in clients and any forthcoming standards for communicating IP addresses from edge servers, standards for communicating the results of Sender ID checks from the edge servers, and so on. Additionally, it should be noted that the Sender ID test is not limited to any particular sender identification technique or framework (e.g., sender policy framework (SPF), sender ID framework from MICROSOFT (Microsoft is a trademark of the Microsoft Corporation, Redmond, Wash.), and so on), but may include any mechanism that provides for authentication of a user or domain.

Monetary Attachment 210(8)

The monetary attachment 210(8) identifying mechanism involves inclusion of a monetary amount to a message for sending, in what may be referred to as an "e-stamp". For example, a sender of the message may attach a monetary amount to the message that is credited to the recipient. By attaching even a minimal monetary amount, the likelihood of a spammer sending a multitude of such messages may decrease, thereby increasing the probability that the sender is not a spammer. A variety of other techniques may also be employed for monetary attachment 210(8), such as through a central clearinghouse on the Internet that charges for certifying messages. Therefore, a certificate included with the message may act as a form of proof that the sender paid an amount of money to send the message. Although a variety of identifying mechanisms 210(1)-210(8) have been described, a variety of other identifying mechanisms 210(X) may also be employed without departing from the sprit and scope thereof.

As previously described, the SSSL 118(n) may reference one or more identifying mechanisms 210(x) and an action to be taken based on which of the identifying mechanisms 210(x) are satisfied by a message. For example, the communication module 106(n) may compare data from a message with the identifying mechanisms 210(x) and determine whether any associated actions are to be performed. These actions are then taken, which might result in guaranteed delivery, a message being passed on to the filter module 214(n) with a hint that the message is not spam, and so on. A variety of other actions may also be taken, examples of which are described as follows.

When a message complies with an entry in the SSSL 118 (n), for example, an associated action is taken. For instance, one such action referenced in the SSSL 118(n) may specify that the message should be passed to a user's inbox with no further filtering. Therefore, in this instance the filter module 212(n) is bypassed to guarantee delivery.

In another example, the message may be further filtered by the filter module 212(n), but the actions that may be performed by the filter module 212(n) in response to the filtering are limited. In this way, the SSSL may be utilized to "bound" the actions that the filter module 212(n) may perform on the message. For example, a SSSL 118(n) entry may specify that a message that satisfies a particular identifying mechanism 210(x) is not to be discarded, no matter what the result is of processing the message by the filter module 212(n). In such an instance, the actions that may be performed by the filter module 212(n) include quarantining the message, routing the message to a spam filter, and so on.

In a further example, the action may be configured as a "hint" to the filter module 212(n). For instance, the form and magnitude of the hint can be used to increase or decrease the probability that a message, when processed by the filter module 212(n), will be considered "spam". The hint, for example, may take the form of a weight for adding to a probability calculation using a linear model, an absolute reduction in a probability assigned the message, a change in the filtering threshold (e.g., to be less aggressive), an additional feature that is included in the decision process, and so forth.

In an implementation, each identifying mechanism 210(x) (or combination of identifying mechanisms 210(x)) will have a default action in the SSSL 118(n). For example, if a user adds an entry to the SSSL 118(n) that references self-signed certificates 210(3), the communication module 106(n) may suggest an action that reflects an understanding of the current security of the identifying mechanism 210(x). Over time, as certified mail and SSSLs become more prevalent and important to email and other types of messaging, attackers may be more motivated to attack SSSLs. As this happens, the default action for various identifying mechanisms 210(x) may be changed, such as based on feedback obtained by an email provider. Default actions may be selected in a variety of ways, such as manually by a user, through use of machine learning, and can be distributed through software updates, via an anti-spam web service, and so on.

The actions may also be configured to implement a hierarchy which addresses the various degrees of certainty afforded by the identifying mechanisms 210(x). For example, the manager module 116(m) may be executed on the server 110(m) to store the messages 114(h) of FIG. 1 in one of a plurality of folders 214(1), . . . , 214(y), . . . , 214(Y) based on the identifying mechanisms satisfied by the messages. The plurality of folders 214(1)-214(Y) are illustrated as forming a hierarchy 216 from "more likely" to "less likely" which indicate respective likelihoods that the identifying mechanisms indicate the actual identity of a sender of a message. The manager module 116(m), for instance, may receive a first message that satisfies each of the identifying mechanisms 210(1)-210(8) previously described. Therefore, such a message is very likely to correctly identify a sender of the message, and is thus routed to the "more likely" folder 214(1), which may be configured as a user's inbox. Another message, however, may not satisfy any of the identity mechanisms 210(1)-210(8), and therefore is route to the "less likely" folder 214(Y), which may be configured as a "spam" folder.

A further message may satisfy the email address 210(1) and self-signed certificate 210(3) identifying mechanisms. Such a message may be routed to an "intermediate" folder 214(y), which may be configured as a "quarantine" folder in an email implementation. A variety of other hierarchical identifying mechanisms and corresponding actions may be employed, further discussion of which may be found in relation to FIG. 3.

Although the following discussion will describe the utilization of a SSSL 118(n) on a client 102(n), SSSLs 118(n), 118(k) may be configured to work similarly on the clients 102(n) and servers 110(m), respectively. However, how the SSSLs 118(n), 118(k) are stored may be different. For instance, the SSSL 118(n) on the client 102(n) may be stored in binary format in a registry, in a separate file, and so on. Certificates (which will be described in greater detail in the following discussion) can be stored with the SSSL, can be stored securely in a "certificate store" of an Operating System (e.g., "my Certificates"), and so on. The storage and management of the certificate, for instance, may be performed by a configuration application programming interface (CAPI). A reference/index to the certificate is stored along with the email address of the sender in the SSSL in the registry/file. For servers, the SSSL may be stored as part of the per-account information for the clients 102(n) on the server 110(m).

Exemplary Procedures

The following discussion describes techniques of SSSLs that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. It should also be noted that the following exemplary procedures may be implemented in a wide variety of other environments without departing from the spirit and scope thereof.

Figure 3:
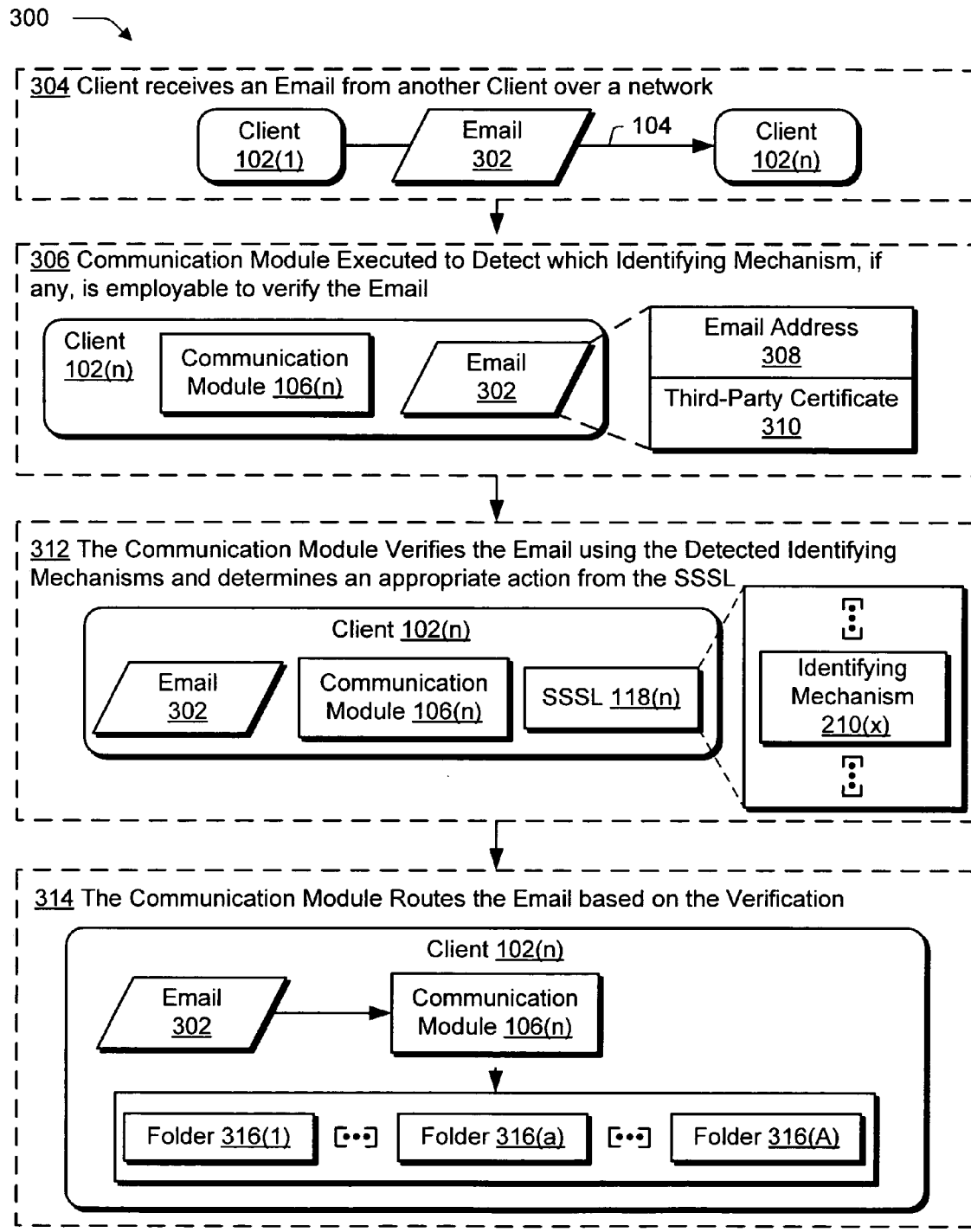
FIG. 3 is a flow chart depicting a procedure in an exemplary implementation in which a message configured as an email is processed utilizing a plurality of identifying mechanisms.

FIG. 3 is a flow chart depicting a procedure 300 in an exemplary implementation in which a message configured as an email is processed utilizing a plurality of identifying mechanisms. A client 102(n) receives an email 302 from another client 102(1) over a network 104 (block 304). For example, the client 102(1) may communicate the email over the network 104 to the server 110(m) of FIG. 1. The email 302 may then be retrieved by the client 102(n) through execution of the communication module 106(n).

The communication module 106(n), when executed on the client 102(n), detects which identifying mechanism, if any, is employable to verify the email 302 (block 306). For example, the communication module 106(n) may examine the email 302 to determine if any of the plurality of identifying mechanisms 210(1)-210(X) of FIG. 2 may be utilized to verifying the identity of the sender. For instance, the communication module 106(n) may examine header information in the email 302 to determine an email address 308, from which, the email 302 was sent. The communication module 106(n) may also examine the email 302 to locate a third-party certificate 310.

The communication module 106(n) is then executed to verify the email 302 using the detected identifying mechanisms 210(x) and determine an appropriate action from the SSSL 118(n) (block 312). For example, the communication module 106(n) may query the certificate provider 114(1) of FIG. 1 to determine if the third-party certificate 310 is valid. If the verification is successfully performed (e.g., the third-party certificate is verified as valid), the communication module 106(n) may then determine which action should be performed on the email 302 from the SSSL 118(n). For instance, the SSSL 118(n) may have a plurality of entries which reference combinations of identifying mechanisms 210(x) and corresponding actions. Therefore, the communication module 106(n) may inspect the SSSL 118(n) to determine which action should be performed when the email 302 is verified as having a specified email address 308 and a verified third-party certificate 310. The SSSL 118(n) may also reference actions to be performed when one or more of the identifying mechanisms 210(x) fail. For instance, the third-party certificate 310 included in the email 302 may not be able to be verified, such as through unavailability of the certificate provider 114(1) of FIG. 1, counterfeiting of the third-party certificate 310, and so on.

One example of such an action is the routing of the email 302 based on the verification (block 314). For instance, the client 102(n) may include a plurality of folders 316(1), . . . , 316(a), . . . , 316(A). Each of the plurality of folders 316(1)-316(A) in this example is configured to correspond to a hierarchical level of certainty that the email 302 was sent by the indicated sender, progressing from least certain (e.g., folder 316(A)) to most certain (e.g., folder 316(1)). Therefore, an email 302 having an email address 308 included in the SSSL 118(n) and a verified third-party certificate 310 may provide a great deal of certainty that the sender is valid (i.e., who they say they are), and thus be routed to folder 316(1), such as the client's inbox. On the other hand, if verification of the third-party certificate 310 failed, but the email address 308 matches an email address in the SSSL 118(n), the email 302 may be routed to an intermediate folder 316(a), such as a quarantine folder. A variety of other routing techniques and other actions may be performed based on a result of the verification of the email 302, such as routing to the filter module 212(n) of FIG. 2 for further processing, including a "hint" regarding the result of the verification to the filter module 212(n), and so on, further discussion of which may be found in relation to the following figure.

Figure 4:
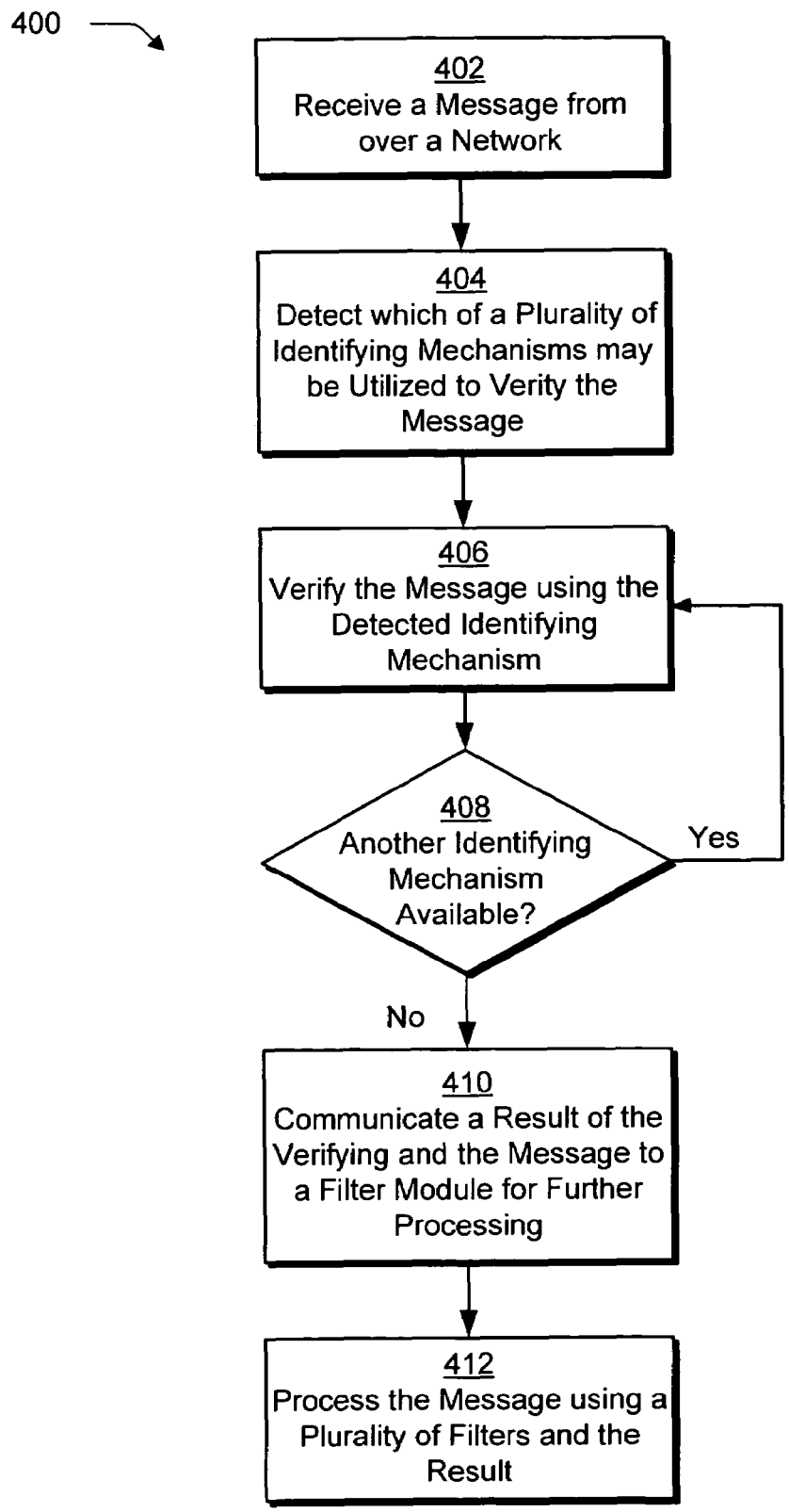
FIG. 4 is a flow chart depicting a procedure in an exemplary implementation in which a message is processed utilizing a plurality of identifying mechanisms, the result of which is communicated to a filter module for further processing of the message.

FIG. 4 is a flow chart depicting a procedure 400 in an exemplary implementation in which a message is processed utilizing a plurality of identifying mechanisms, the result of which is communicated to a filter module for further processing of the message. A message is received from over a network (block 402). In a first example, the message is an email message that is communicated via the Internet. In another example, the message is an instant message.

As before, a communication module is executed to detect which of a plurality of identifying mechanisms may be utilized to verify the message (block 404). For example, the message may be examined to determine if it includes a sender's address (e.g., email address), a third-party certificate, a self-signed certificate, a passcode, a computational proof, an IP address, a sender identifier, a monetary attachment, and so on. The communication module then verifies the message using one or more of the detected mechanisms (block 406). For example, a communication module may determine that the message includes the sender's address and then verify whether the sender's address is included in a SSSL. The communication module may then determine if another identifying mechanism is available (decision block 408), and if so, verify the message using the detected identifying mechanism (block 406). Continuing with the previous example, the communication module may determine that the message includes a result of a computational proof, and then verify whether the result is correct.

Once no other identifying mechanisms are available (decision block 408), a result of the verifying and the message are both communicated to a filter module for further processing (block 410). For example, the result may indicate which identifying mechanisms were utilized for consideration by the filter module when processing the message. In another example, the result may be a value indicating a relative likelihood that the message was sent from a trusted sender. For instance, the value may be configured as a likelihood score that the sender is not a spammer.

The filter module may then process the message using a plurality of filters and the result (block 412) as previously described. For example, the result may act as a "hint" to the filter module for use with one or more spam filters for further processing, such as a weight for adding to a probability calculation using a linear model, an absolute reduction in a probability assigned the message, a change in the filtering threshold (e.g., to be less aggressive), an additional feature to the decision process, and so forth. Thus, the SSSL may be employed with other spam filters to process a message.

Figure 5:
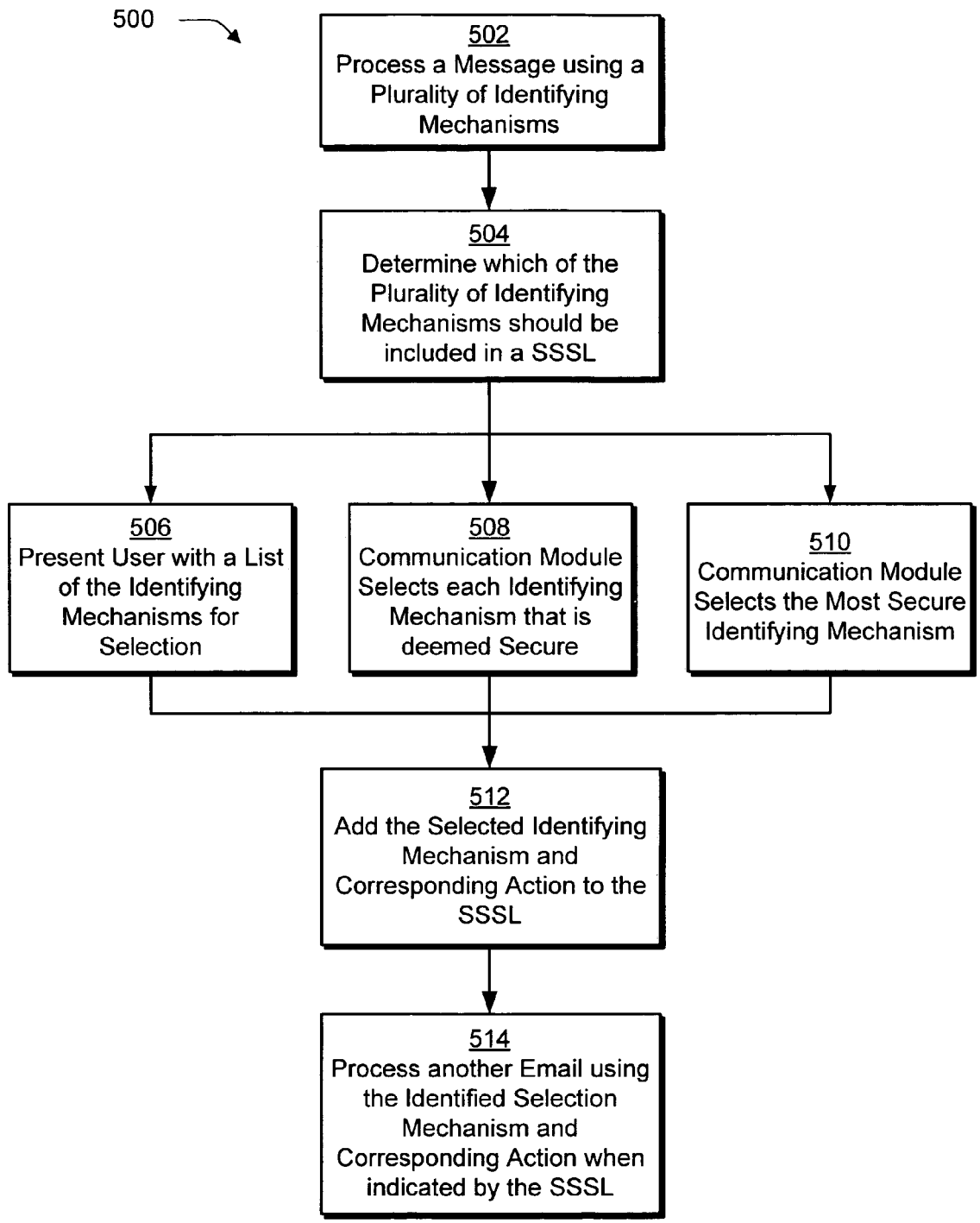
FIG. 5 is a flow diagram depicting a procedure in an exemplary implementation in which a secure safe senders list is populated.

FIG. 5 is a flow diagram depicting a procedure 500 in an exemplary implementation in which a secure safe senders list is populated. In an implementation, adding entries to an SSSL list is a bit more involved than adding entries to a traditional safe sender list because one or more identifying mechanisms and an action are specified. For example, a communication module may process a message utilizing a plurality of identifying mechanisms (block 502), such as through the procedure 400 of FIG. 4. Next, a determination is made as to which of the plurality of identifying mechanism should be included in a SSSL (block 504) for future processing of messages. There are a variety of modes that may be employed for adding a new entity to an SSSL, such as in response to a user explicitly indicating that the entity should be added, because the communication module suggested that the entity should be added, and so on.

In a "user driven" mode, for instance, the user is presented with a list of the identifying mechanisms for selection (block 506). In an implementation, the identifying mechanisms output to the user are those which are present in the message. For example, the communication module may indicate which of the plurality of identifying mechanisms 210(x) are met by the message, such as through highlighting, inclusion of just those identifying mechanisms in a menu, and so on. The user can then select the methods to be added to the SSSL, such as not to include self-signed certificates if the user knows that the mail transport agent (MTA) sometimes breaks signatures, and so on.

In a "software driven" mode, the communication module is executed to select each identifying mechanism met by the message that is deemed secure (block 508). For instance, the communication module may include a configuration file that describes which of the plurality of identifying mechanisms 210(x) of FIG. 2 is secure as previously described. The configuration file may be modified via software updates, via an anti-spam web service, configured by the user, and so on.

In a "most secure" mode, the communication module is executed to select the "most secure" identifying mechanism (or combination thereof) (block 510) for verifying the identity of a sender. The relative security of the identifying mechanisms may be contained in a configuration file and can be changed via software updates, via an anti-spam web service, by user configuration, and so forth.

The selected identifying mechanism(s) and the corresponding action are then added to the SSSL (block 512). Thus, another email may be processed using the identified selection mechanism and corresponding action when indicated by the SSSL (block 514). In an implementation, when a new entry is made to the SSSL, the communication module is executed to check if there are any less secure entries and offer to remove these entries, such as by prompting a user as to the existence of entries for a particular sender having less secure identifying mechanisms.

In another implementation, the communication module may utilize a variety of additional considerations when adding a user to the SSSL, i.e., a user's address and another identifying mechanism. For example, the communication module may offer to add a sender when the user has received and read one or more messages from the particular sender. The criteria for making this suggestion can also be affected by the presence of the identifying mechanisms discussed above. A message with accompanying computational proof, for instance, may result in immediately suggesting that the user add the sender to the SSSL, while the presence of a third-party certificate might result in a prompt the second time a message from that sender is read. In general, the criteria used to suggest (or even automatically add) senders to the SSSL can be made easier or more stringent depending on the presence or absence of any of the identifying mechanisms that were previously described.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving a message from a sender via a network;
verifying an identity of the sender using a plurality of identifying mechanisms referenced in a safe sender list,
wherein at least one said identifying mechanisms is able to be performed without utilizing a sender's address and without querying the sender;
filtering the message by taking a form of a weight for adding to a probability calculation using a linear model;
processing the filtering of the message based on a form and a magnitude of the filtering by increasing or decreasing a probability that the message will be considered a spare;
accessing the safe sender list which includes one or more available identifying mechanisms, wherein the available identifying mechanisms comprise a monetary attachment;
verifying the message based on the monetary attachment;
determining which of a plurality of hierarchical levels is satisfied by the message,
wherein each said hierarchical level is defined in a list of said identifying mechanisms,
wherein each hierarchical level is defined by mechanisms for identifying a sender of the message, and
wherein each hierarchical level corresponds to a likelihood that a sender's identity verified according to the mechanisms referenced by the hierarchical level is accurate;
routing the message based on the determined hierarchical level corresponding to the message.

2. A method as described in claim 1, wherein the message is an email or an instant message.

3. A method as described in claim 1, wherein the verifying includes using a combination of said identifying mechanisms that, when satisfied, is suitable for identifying the sender.

4. A method as described in claim 1, wherein the verifying includes using another said identifying mechanism that utilizes the sender's address.

5. A method as described in claim 1, wherein the plurality of identifying mechanisms are selected from a group consisting of:
   a third-party certificate;
   a self-signed certificate;
   a passcode;
   a result of a mathematical proof; and
   a sender ID.

6. A method as described in claim 1, wherein:
   one said identifying mechanism is a third-party certificate; and
   the third-party certificate is issued by a third-party certificate provider that is available over the network for authenticating the third-party certificate.

7. A method as described in claim 1, further comprising:
   determining which of a plurality of hierarchical levels is satisfied by the message, wherein each said hierarchical level is defined in a list of said identifying mechanisms; and
   performing an action utilizing the message according to the determined said hierarchical level.

8. A method as described in claim 1, wherein the verifying is performed using a list describing a plurality of combinations of said identifying mechanisms that, when satisfied, verify an identity of the sender, and further comprising routing the message based on which said combination, if any, is satisfied by the message.

9. A removable medium memory comprising computer executable instructions that, when executed on a processor, direct the processor to perform the method as described in claim 1.

10. A method as described in claim 1, wherein one said hierarchical level includes a combination of two said mechanisms that, when satisfied, are suitable for identifying the sender.

11. A removable medium memory comprising computer executable instructions that, when executed on a processor, direct the processor to verify an identity of a sender of an email using a third-party certificate, the instructions comprising;
   code to receive the email from a sender via a network;
   code to access a safe sender list which includes one or more available identifying mechanisms, wherein the available identifying mechanisms comprise the third-party certificate;
   code to provide different hierarchical levels of security for the email,
   wherein each hierarchical level is defined in a list of identifying mechanisms,
   wherein each hierarchical level corresponds to a likelihood that a sender's identity is verified according to mechanisms referenced by the hierarchical level is accurate,
   wherein one of said hierarchical levels corresponds the presence of a third-party certificate, wherein the hierarchical level corresponding to the presence of third-party certificate provides guaranteed routing to a user's inbox;
   code to filter the email by taking a form of a weight for adding to a probability calculation using a linear model;
   code to process the filtering of the email based on a form and a magnitude of the filtering by increasing or decreasing a probability that the email will be considered a spam;
   code to verify the identity of the sender based on the identifying mechanisms corresponding to said hierarchical level corresponding to the presence of the third-party certificate and
   code to route the message based on verifying the identity of the sender.

12. The removable medium memory as described in claim 11, wherein the computer executable instructions direct the computer to verify the identity using another identifying mechanism.

13. The removable medium memory as described in claim 12, wherein the another identifying mechanism is selected from the group consisting of:
   a self-signed certificate;
   a passcode;
   a result of a mathematical proof;
   a sender ID; and
   a monetary amount that is attached to the message.

14. The removable medium memory as described in claim 11, wherein the third-party certificate is issued by a third-party certificate provider that is available over a network for authenticating the third-party certificate.

15. The removable medium memory as described in claim 11, wherein the computer executable instructions direct the computer to verify the identity using a list that describes a plurality of combinations of identifying mechanism that, when satisfied, verify the identity of the sender, and perform an action on the message based on which said combination is satisfied by the message.

* * * * *